Patented Jan. 26, 1954

2,667,430

UNITED STATES PATENT OFFICE 2,667,430

SYNTHETIC RESIN IMPREGNATED GLASS FABRIC AND METHOD OF MAKING SAME

James R. Wells, Mishawaka, Ind., assignor to United States Rubber Company, New York, N. Y., a corporation of New Jersey No Drawing. Application March 4, 1953, Serial No. 340,397

6 Claims. (Cl. 117—76)

This invention relates to polyester resin-impregnated glass fabric of greatly enhanced transparency and to a method of making the same. More particularly it relates to so-called "Photoply" material used for making phototemplates. Still more particularly, it relates to such a material which has a glass fabric base but from which the appearance of the fabric base has been substantially eliminated so that the material has a more homogeneous appearance. Even more particularly, it accomplishes these purposes without pre-treatment of the glass fabric for the removal of sizing, lubricating and like materials commonly applied by the glass manufacturer to the filaments when drawn.

For a number of years "Photoply" material has been made by impregnating glass cloth of a suitable light weight with a polyester resin typified by a solution of diethylene glycol maleate in monomeric styrene, this polyester resin being subsequently cured in well-known manner. However, the product of the method heretofore employed has not possessed the property of transparency and has left much to be desired in this respect. The prior product was translucent but by no means transparent. The fibers and weave of the original glass cloth were plainly visible in the product and this fabric pattern was transferred to the print made by photographing through the "Photoply." This was highly objectionable. In the making of phototemplates it is highly desirable that the "Photoply" material used be transparent. The present invention has for its object the provision of a simple, economical and highly effective means of making a cured polyester resin-impregnated glass fabric of greatly enhanced transparency.

The present invention is based upon my discovery that if the glass fabric is treated with a hydrocarbon-soluble condensation product of urea, formaldehyde and normal butyl alcohol dissolved in a mixture of an inert or non-polymerizable volatile organic solvent and monomeric styrene, dried, and heated to cure the resulting deposit, the fabric will have greatly enhanced transparency after impregnation with and curing of the polyester resin.

In practicing my invention I almost invariably use glass fabric containing the sizing material commonly employed by the manufacturer of the glass filaments for the purpose of preventing the fabric from injuring or destroying itself during processing. An extremely important feature of my invention is that it makes it possible to use this sized glass fabric without treatment to remove the sizing. In the manufacture of cured polyester resin-glass fabric composites, it is customary to treat the glass fabric to remove this sizing before impregnation with the polyester resin. However, removal of the sizing adds considerably to the expense and introduces complications because it is usually done by heating the fabric at 600–900° F. for 12–72 hours. This stringent heat treatment makes the fabric brittle and seriously degrades its mechanical properties until a new lubricating or sizing is applied and even then the fabric is often of low grade compared to fabric which has been sized throughout its life. It will be seen that my invention, by eliminating the necessity for this "heat cleaning," is highly advantageous. The steps of applying the butylated urea-formaldehyde resin in solution and curing the resulting deposit form a substantially transparent linkage between the organic sizing material on the glass fibers and the final cured polyester resin, giving a much more homogeneous mass. Thus, my invention makes it possible to achieve greatly enhanced transparency in the final product without removing the organic sizing on the glass fibers, whereby the glass fibers are afforded the protective action of the sizing during processing in accordance with the invention.

In practicing my invention I utilize a thermosetting hydrocarbon-soluble urea-formaldehyde-normal butyl alcohol condensate of well-known type. This condensate is one wherein normal butyl alcohol has been reacted with urea and formaldeheyde or with intermediate condensation products of urea and formaldehyde such as monomethylol urea and dimethylol urea. Reaction with the butyl alcohol effects formation of butyl ether linkages, as portrayed on page 176 of Wakeman, "The Chemistry of Commercial Plastics," and makes the condensate soluble in the aliphatic and aromatic hydrocarbon compounds normally used as solvents in preparing organic coating compositions. The manufacture of such condensates is described in U. S. patents to Edgar et al. 2,191,953 and Ludwig 2,171,882 and 2,217,372. Such condensation products are also described in Myers 2,293,164; 2,367,423 and 2,386,744. I prefer to employ those butylated condensates which when dissolved in a 1:1½ (by volume) mixture of xylol and n-butyl alcohol give a solution having a viscosity at 25° C. of L–Q on the Gardner-Holdt scale and which are heat-reactive with "Vinylite VAGH" (a copolymer of 91% vinyl chloride, 3% vinyl acetate and 2.3% of hydroxy containing vinyl (must be multiplied by 2.6 to equal polyvinyl alcohol) having a specific gravity of 1.39 and intrinsic viscosity of 0.57) and with alcohol-soluble heat-reactive B-stage para-substituted phenolformaldehyde resins such as "Bakelite BV-1600."

These preferred condensates are relatively slow curing. Faster curing condensates can be used provided the curing conditions are adjusted to allow penetration of and interaction with the sizing before curing of the condensate prevents further penetration and coverage of the glass interface. Condensates other than the preferred condensates may give results which initially appear to closely approximate those achieved with the preferred condensates but which upon aging or exposure to heat and moisture cause a marked loss of transparency due to shrinkage.

The butylated urea-formaldehyde resin is soluble in the common hydrocarbon solvents and mixtures thereof with other solvents commonly used in the coating industry. Typically the butylated urea-formaldehyde resin is supplied commercially in the form of a solution of about 60% solids content in a mixture of xylol and n-butanol in a volume ratio of 1:1½ and this solution can be used in admixture with styrene in the practice of my invention.

An example of the preferred butylated urea-formaldehyde condensate which can be used in my invention is that known commercially as "Uformite F-240." This material which is supplied commercially by the Resinous Products Division of Rohm & Haas Company, Philadelphia, is identified as "butylated-urea-formaldehyde condensate" in Research Association of British Rubber Manufacturers, Information Bureau Circular No. 372, Annotated Comprehensive List of Trade Names of Synthetics, 105 Lansdowne Road, Croydon, October 1949. It is also described in a trade booklet entitled "Uformite" published in September 1949 by Rohm & Haas Company. It is furnished as a 60% solids solution in a xylol-butanol (1:1½ by volume) having a specific gravity of 1.02 and a viscosity (Gardner-Holdt at 25° C.) of L–Q. It has a mineral thinner tolerance of at least 50 cubic centimeters of mineral thinner tolerated by 10 grams of this solution and an isooctane tolerance of at least 34 cubic centimeters. The acid number of its solids content ranges from 3 to 8. It exhibits the lowest shrinkage in film forming properties of this type of condensate and it is coreactive with alcohol-soluble phenol-formaldehyde resins and with "Vinylite VAGH."

In practicing my invention, I employ the butylated urea-formaldehyde condensate in solution in a mixture of an inert volatile organic solvent (such as that in which it was supplied by the manufacturer) and monomeric styrene. Typically, when the glass fabric is impregnated at room temperature, this solution consists of 20 to 30% of the butylated urea-formaldehyde condensate, 12 to 22% of inert volatile organic solvent and 48 to 68% of styrene, these percentages being by weight and totaling 100%. When impregnation is done at elevated temperature, for example, by pre-heating the glass fabric or heating the treating solution, a higher solids level in the solution can be used.

With this solution of the condensate in the inert solvent and styrene I incorporate a small amount of a known catalyst for the condensate if it is desired to shorten the time of cure. Any catalyst known to effect advancement of urea-formaldehyde condensates to the C-stage can be used. An example is mono diethyl acid orthophosphate.

The sized glass fabric is impregnated with the resulting solution of condensate, inert solvent and styrene, with or without catalyst, using such conditions that the glass fibers are coated but the interstices of the fabric are not completely filled after curing of the deposit obtained on drying. The impregnated fabric is dried to remove the volatiles therefrom and convert the coating to a tacky form in which it will not stick to the fingers in such a way as to "lift." A substantial portion of the styrene is lost in the drying step but I believe that a substantial portion thereof remains and is caused to polymerize and react with the condensate, in the drying and subsequent curing. As evidence of the fact that polymerization or reaction of the styrene occurs so as to produce the new results of my invention, I may cite the fact that numerous attempts to replace the styrene in the treating solution with inert or non-polymerizable solvents such as xylol and n-butyl alcohol were unsuccessful because the final product had lowered transparency.

The dried fabric is then cured by heating, typically at a temperature of from 275° F. to 325° F. for from 3 to 6 minutes.

I believe that the unique results of my invention are attributable to the following mechanism, namely that the treated glass fabric is more easily wetted by the polyester resin, and that considerable cross-polymerization between the condensate deposit on the glass fibers and the polyester resin occurs. My invention also effects much greater elimination of air pockets in the final product, this being particularly important at the points where the glass yarns or threads cross over. My invention also practically eliminates movement of the yarns or threads relative to one another and relative to the encasing polyester during the final stages of polymerization of the polyester, this relative movement normally occurring because of differential shrinkage (longitudinal and crosswise) during the final stages of polymerization my invention also prevents thread identification both where the threads cross each other and in the lengths of thread between crossover points. Overcure or undercure of the condensate deposit on the cloth will cause the final product to have either reduced transparency or less stable transparency and should be avoided. By "less stable transparency" I mean that upon standing under ordinary conditions of atmospheric humidity the initial high transparency of the final product is gradually impaired. In addition, if the deposit is undercured, handling of either the treated cloth or the final cloth causes a milky appearance to develop which is highly objectionable. Those skilled in the art can readily avoid overcuring or undercuring of the condensate deposit.

During the drying and curing steps, the fabric undergoes a loss of volatile materials, usually ranging from 60 to 80% of the weight of the solution applied in the impregnating step.

The level of solids applied by the impregnation with and curing of the above treating solution may vary widely. It is not possible to specify exactly the amount of material deposited in this step required in all cases for optimum transparency of the final glass filament-plastic resin assembly. The optimum amount varies widely depending upon the type of glass fabric employed, its weave, and the type and amount of sizing material thereon. The starch binder or sizing on the glass fabric varies with each fabric because the yarns from which glass fabric is woven are not uniformly treated with the mixture of starch, mineral oil and cationic active amine commonly used in the manufacture of glass yarn. With a commercial 3.16 ounce (weight per square yard) woven glass fabric having a thread count of 60 x 58, commonly known as "116 construction," I find that optimum transparency of the final "Photoply" material is achieved with an amount of treating solution and treating conditions such that approximately 5 to 20%, and preferably 10 to 15% by weight of solids based on the weight of original fabric is deposited in the treatment. With heavier weight glass fabrics, in which the ratio of starch binder or sizing to weight of fabric is changed, a different optimum amount must be applied. However, those skilled in the art can readily determine the amount required for optimum transparency in the light of this specification.

The resulting treated fabric is then impregnated in the conventional way with a curable polyester resin solution followed by curing this solution so as to coat the treated glass filaments and yarns and substantially completely fill the interstices of the treated fabric with the cured polyester resin. The polyester employed and the procedure of impregnating and curing it are conventional and do not need to be described in detail. However, I may state that best results are achieved by pre-spreading the treated fabric with polyester resin, rolling it up, rotating the roll several hours during which time complete saturation is obtained, applying more polyester resin, and finally curing. The final curing is preferably performed in accordance with Landgraf 2,528,152.

The curable polyester resin composition comprises an organic peroxide as polymerization catalyst, an esterification product of an alpha-ethylenic alpha, beta-dicarboxylic acid with a glycol, this esterification product being an advanced unsaturated linear polyester containing unesterified carboxyl groups and having an acid number of from 5 to 100, this polyester being dissolved in and copolymerizable with a miscible liquid monomeric polymerizable ethylenic compound which is immiscible with water and contains the terminal group $CH_2=C<$. Polyesters of this type are described in U. S. Patent 2,195,362. In use, such unsaturated linear polyesters are mixed with and dissolved in the polymerizable ethylenic monomer, for instance styrene, diallyl phthalate, diallyl fumarate or triallyl cyanurate, and the mixture is cured to solid form by heating in the presence of a suitable peroxide catalyst. Typical mixtures of unsaturated linear polyester and copolymerizable ethylenic monomer used in practicing my invention are described in U. S. Patents 2,255,313 and 2,443,736 to 2,443,741. As descriptive of such mixtures, the disclosure of said patents is hereby incorporated by reference in order to avoid undue repetition. As is well known, the unsaturated dicarboxylic acid used in the manufacture of the polyester can be partially replaced by another dibasic acid which may be typified by adipic acid, succinic acid, sebacic acid, phthalic anhydride, and tetrachlorophthalic anhydride, and which may be used in amounts up to 3 moles per mole of unsaturated dicarboxylic acid. Any organic peroxide that functions as a free radical type polymerization initiator can be used.

In making "Photoply" material in accordance with my invention, I almost invariably employ a square-woven glass fabric containing the original organic sizing material. Usually the final product contains but a single layer of this fabric. However, it may contain a plurality of layers of glass fabric pretreated with butylated urea-formaldehyde condensate and styrene in the manner described above and subsequently impregnated with the polyester resin and plied up to any suitable thickness, the curing of the polyester resin serving to bond adjacent plies together.

In making phototemplate material the woven fabric used is generally light in weight, typically under 4 ounces per square yard. For other applications, heavier fabrics such as 6 ounce/yard and heavier can be used.

In proper end use applications, I may employ glass fabrics other than woven fabrics, for example, fabrics wherein glass fibers are randomly oriented as in the case in a felted mass of glass fibers such as a mat or preform. My invention is applicable wherever greatly enhanced transparency of a composite cured polyester resin-fibrous glass article is desired. The enhanced moisture-resistance imparted to such articles by the treatment of my invention is highly advantageous.

*Example I*

A 3.16 ounce glass fabric having a thread count of 60 x 58 and known as "116 construction" and embodying the sizing applied by the glass manufacturer is impregnated with the following formulation:

| | Parts by weight |
|---|---|
| "Uformite F-240" (60% solids) | 42 |
| Styrene | 58 |
| Monodiethyl acid orthophosphate | 0.075 |

The foregoing ingredients are commingled together just prior to use to give a mixture having a specific gravity of about 1.52 and a solids content of approximately 25%. Following impregnation the fabric is dried to remove volatiles. It is now tacky and does not stick to the fingers. It is then cured for about 3 minutes at 325° F. The solids applied by the treatment equal 13.2% by weight based on the initial fabric. The filaments and yarns in the resulting fabric are coated by the cured mixture of the deposited solids but the fabric is permeable to air, indicating that such interstices as were possessed by the original very closely woven fabric remain open.

The fabric is then impregnated in the conventional way with a peroxide-catalyzed commercial polyester resin known as "Vibrin" which is a solution of diethylene glycol maleate in monomeric styrene. The polyester resin, like all polyester resins of this type, is 100% polymerizable and upon curing the resulting impregnating fabric in accordance with Landgraf 2,528,152, there is obtained a material the interstices of which are substantially completely filled with cured polyester resin. The resulting material is highly transparent, dimensionally stable, and is ideally suited for the manufacture of phototemplates.

*Example II*

The same fabric as was used in Example I was pre-treated in exactly the same way as in that example. The treated fabric was pre-spread with the polyester resin, rolled up, rotated in the roll for 12 hours, unrolled, coated with more of the polyester resin, plied up to form a structure 32 layers thick, and cured in a platen press to give a boardy product useful for the construction of housings which allow free passage of frequencies used in radar. This product had a tensile strength of 49,967 p. s. i. After 24 hours immersion in water at room temperature, the tensile strength was 51,000 p. s. i. In contrast, a comparable board made without the pretreatment of the fabric had a tensile of 50,725 p. s. i. before water immersion and a tensile of 44,000 p. s. i. after the 24 hour water immersion.

Although the foregoing examples refer to the use of a particular type of polyester resin, those skilled in the art will understand that any commercial polyester resin can be used.

From the foregoing description many advantages of my invention will be apparent to those skilled in the art. The principal advantage is that the invention provides a simple and highly effective method of obtaining cured polyester resin-fibrous glass products of greatly enhanced transparency. Another and very important advantage is that the pre-treating step of the invention forms a unique bond between the sizing on the glass fibers and the polyester resin and yields a product of enhanced transparency without necessity of preliminary removing the sizing from the glass fabric. Elimination of the necessity for cleaning the glass fabric by a solvent or by high temperature exposure to remove starch and other extraneous organic matter applied by the glass manufacturer as sizing is extremely advantageous because it simplifies the production and reduces the costs and because the beneficial protective action of the sizing is not dispensed with at any time during processing in accordance with my invention. Another advantage is that the product has good dimensional stability with respect to change upon exposure to moisture, its dimensional stability in this respect being better than that of the prior material. In addition my product has good dimensional stability with respect to heat. The initial treatment of the glass causes the cured polyester and the glass to be locked together so that they move together rather than separately upon exposure to thermal change. In other words, the pre-treatment of the glass fabric brings about such a degree of penetration of the yarns by the condensate and the polyester that air is much more completely removed, resulting in enhanced transparency, and such a degree of bonding of the individual fibers that at a given locus no component portion of the final product can move relative to another portion. Another advantage is that the product has unimpaired flexibility as compared to material made without the pre-treatment. It will be seen that I achieve results which could not be achieved with either the polyester alone or the condensate-styrene mixture alone. The product of the invention is equal to the prior material in uniformity of texture, flatness and freedom from blemishes, and in some cases is better than prior material in these respects. It was surprising to find that the treatment with a urea-containing material did not impair resistance to moisture. Numerous other advantages will appear to those skilled in the art.

Although my invention has been described with particular reference to glass fabric containing the conventional sizing for the fibers, it works very well with glass fabric cleaned of sizing.

Having thus described my invention, what I claim and desire to protect by Letters Patent is:

1. As a new article of manufacture, a cured polyester resin-impregnated glass fabric comprising glass fabric the fibers of which are coated with a cured mixture of the material deposited upon drying of a solution of a hydrocarbon-soluble condensation product of urea, formaldehyde and butyl alcohol in a mixture of an inert volatile organic solvent and monomeric styrene, the amount of said cured mixture being such that the interstices of the fabric are not filled, this structure being coated and having its interstices substantially filled with cured polyester resin comprising an unsaturated linear polyester and a copolymerizable ethylenic monomer which is a solvent for said linear polyester.

2. An article of manufacture as set forth in claim 1 wherein said glass fabric is a woven fabric the fibers of which are protected by sizing.

3. An article of manufacture as set forth in claim 1 wherein said condensation product has an acid number of 3 to 8 and when dissolved in a 1:1½ mixture of xylol and butyl alcohol to 60% solids concentration forms a clear, colorless solution having a specific gravity of 1.02, a Gardner-Holdt viscosity at 25° C. of L–Q and a minimum mineral thinner tolerance of 50 cubic centimeters of mineral thinner per 10 grams of the solution.

4. The method of making a material comprising cured polyester resin-impregnated glass fabric which comprises the steps of treating the glass fabric with a hydrocarbon-soluble condensation product of urea, formaldehyde and butyl alcohol in solution in a mixture of an inert volatile organic solvent and monomeric styrene, drying, curing the deposited material, subsequently coating and impregnating the thus-treated fabric with a solution of an unsaturated linear polyester in a copolymerizable ethylenic monomer, and curing the solution thereby deposited around the fibers of and in the interstices of the treated fabric.

5. The method of claim 4 wherein said glass fabric is a woven fabric the fibers of which are protected by sizing.

6. The method of claim 4 wherein said condensation product has an acid number of 3 to 8 and when dissolved in a 1:1½ mixture of xylol and butyl alcohol to 60% solids concentration forms a clear, colorless solution having a specific gravity of 1.02, a Gardner-Holdt viscosity at 25° C. of L–Q and a minimum mineral thinner tolerance of 50 cubic centimeters of mineral thinner per 10 grams of the solution.

JAMES R. WELLS.

No references cited.